United States Patent
Nalborczyk

(10) Patent No.: US 11,811,172 B2
(45) Date of Patent: Nov. 7, 2023

(54) VARISTORS

(71) Applicant: MPE IP LIMITED, Liverpool (GB)

(72) Inventor: Jan Nalborczyk, Liverpool (GB)

(73) Assignee: MPE IP LIMITED, Liverpool (GB)

( * ) Notice: Subject to any disclaimer, the term of this patent is extended or adjusted under 35 U.S.C. 154(b) by 1157 days.

(21) Appl. No.: 16/071,179

(22) PCT Filed: Jan. 18, 2017

(86) PCT No.: PCT/GB2017/050105
§ 371 (c)(1),
(2) Date: Jul. 19, 2018

(87) PCT Pub. No.: WO2017/125724
PCT Pub. Date: Jul. 27, 2017

(65) Prior Publication Data
US 2021/0167556 A1    Jun. 3, 2021

(30) Foreign Application Priority Data

Jan. 19, 2016 (GB) ..................................... 1600953
Jun. 30, 2016 (GB) ..................................... 1611360

(51) Int. Cl.
*H01R 13/66* (2006.01)
*H01C 7/12* (2006.01)
(Continued)

(52) U.S. Cl.
CPC ........... *H01R 13/6616* (2013.01); *H01C 7/12* (2013.01); *H01H 37/08* (2013.01); *H01H 37/54* (2013.01);
(Continued)

(58) Field of Classification Search
CPC . G06F 21/00; H01R 13/6397; H01R 13/6616; H01R 13/6625; H01R 13/665;
(Continued)

(56) References Cited

U.S. PATENT DOCUMENTS

| | | | | |
|---|---|---|---|---|
| 3,821,686 A | * | 6/1974 | Harnden, Jr. ............ | H01C 7/12 338/21 |
| 4,089,032 A | * | 5/1978 | Dell Orfano ............ | H01C 7/12 361/111 |
| 4,720,760 A | * | 1/1988 | Starr ...................... | H01C 7/102 439/106 |
| 4,825,188 A | * | 4/1989 | Parraud ................... | H01C 7/12 338/21 |

(Continued)

*Primary Examiner* — Kyung S Lee
(74) *Attorney, Agent, or Firm* — Amster, Rothstein & Ebenstein LLP

(57) ABSTRACT

An electrical connector provided with a varistor, and to a protection device for incorporation into an electrical connector and having a varistor comprising at least two pins including a first pin which is a live (502) or neutral (504) pin and a second pin which is an earth pin (506), the first and second pins (502, 504, 506) extending through respective apertures (512) in a varistor plate (514) which has first and second faces, wherein a first conductive layer on the first face of the varistor plate (514) connects electrically to the first pin (502, 504) and a second conductive region on the second face of the varistor plate connects electrically to the second pin (506), so that in response to an excessive voltage across the first (502, 504) and second (506) pins the varistor plate will conduct electricity between the first (502, 504) and second (506) pins. The arrangement can easily be adopted in connectors conforming to existing standards, such as existing mains electrical plugs (500).

18 Claims, 8 Drawing Sheets

(51) Int. Cl.
*H01R 13/713* (2006.01)
*H01R 24/30* (2011.01)
*H01H 37/08* (2006.01)
*H01H 37/54* (2006.01)
*H02G 3/22* (2006.01)
*H02H 9/04* (2006.01)
*H01R 101/00* (2006.01)
*H01R 103/00* (2006.01)

(52) U.S. Cl.
CPC ......... *H01R 13/7137* (2013.01); *H01R 24/30* (2013.01); *H02G 3/22* (2013.01); *H02H 9/041* (2013.01); *H02H 9/043* (2013.01); *H02H 9/044* (2013.01); *H01H 2037/5463* (2013.01); *H01R 2101/00* (2013.01); *H01R 2103/00* (2013.01)

(58) Field of Classification Search
CPC ............ H01R 13/6658; H01R 13/6666; H01R 29/00; H01R 31/065; H01R 9/03; H01R 13/713; H01R 13/7137; H02J 7/00036; H02J 7/00047; H05K 1/0231; H05K 1/18; H05K 2201/10053; H05K 2201/10424; H05K 2201/10515; H05K 2201/1053; H01C 7/12; H01C 7/126; H01C 7/10; H01C 7/102; H01H 2085/0486
See application file for complete search history.

(56) References Cited

U.S. PATENT DOCUMENTS

| | | | | |
|---|---|---|---|---|
| 5,206,780 | A * | 4/1993 | Varreng | H02G 15/06 361/117 |
| 5,224,878 | A * | 7/1993 | Lurie | H01R 13/7195 439/620.12 |
| 5,414,587 | A * | 5/1995 | Kiser | H05K 1/0231 361/118 |
| 5,502,612 | A * | 3/1996 | Osterhout | H01C 7/12 361/117 |
| 6,678,139 | B1 * | 1/2004 | Greater | H01F 27/04 361/117 |
| 6,687,109 | B2 * | 2/2004 | Bennett | H01C 7/12 361/119 |
| 8,179,652 | B2 * | 5/2012 | Depping | H01C 7/126 361/103 |
| 8,514,538 | B2 * | 8/2013 | Crevenat | H01H 83/20 361/105 |
| 8,810,988 | B2 * | 8/2014 | Mosesian | H02H 9/041 361/117 |
| 8,816,812 | B2 * | 8/2014 | Koprivsek | H01C 7/10 338/21 |
| 9,640,969 | B2 * | 5/2017 | Li | H01R 13/713 |
| 9,697,970 | B1 * | 7/2017 | I | H01H 37/76 |
| 2007/0206363 | A1 * | 9/2007 | Cespedes | H02K 19/365 361/748 |
| 2021/0151957 | A1 * | 5/2021 | Hirschmann | H01H 85/44 |

* cited by examiner

VARISTORS

This invention relates to an electrical connector provided with a varistor, and to a protection device for incorporation into an electrical connector and having a varistor.

Varistors have long been used as protection devices in electronic and electrical circuits. A varistor contains a piece of material having special electrical properties, that is to say, it is substantially dielectric (an electrical insulator) at low voltages, but which undergoes dielectric breakdown above a specified threshold voltage, thus rendering it electrically conductive.

A varistor can thus be wired between an input power supply connection of an electrical device or circuit and ground, and will not short to ground under ordinary operating conditions, that is to say, where the input voltage is within certain design parameters. However, should the power supply be subjected to a high voltage transient or an electromagnetic pulse ("EMP"), for example during an electrical storm (e.g. if an overhead powerline is struck by lightning); or as a result of a malicious attack (e.g. if a EMP or IEMI weapon is deployed), then the dielectric breakdown threshold value of the varistor will be temporarily exceeded thereby shorting the input voltage, and hence the transient pulse, to ground. Provided the varistor is placed upstream of the power input of a device or circuit to be protected, it will provide effective protection against EMP, IEMI, and other high voltage transient pulses.

Varistors are a mature technology and are almost ubiquitous in sensitive electronic applications and devices, such as in computers and military equipment, in hospital power distribution networks and the like.

The most important parameters of varistors are their voltage rating (which is based on the supply voltage they are being used on), their energy and peak pulse current handling (i.e. the highest current and energy that can be applied before irreversible damage is caused to it) and their reaction times (i.e. the time taken to transition between the insulating and conducting states). In military applications, where the devices to be protected are most susceptible to malicious EMP and IEMI attacks, there is an ever-increasing need for varistors that exhibit ever higher maximum voltage capacities and ever shorter reaction times—as a result in advances in EMP weaponry, which are currently capable of delivering fast, high energy pulses with rise times of 1-5 ns or even faster. There is also an increasing awareness of the vulnerability of commercial critical infrastructure to the threats of EMP and IEMI. Large varistors can handle the peak currents and energies required but they struggle to operate quickly enough.

Existing varistors are at the limits of their effectiveness against, fast high energy pulses with rise times faster than say 20 ns mainly due to their reaction times, which are typically claimed to be in the 35 ns range for commercial packaged varistors.

One factor which potentially limits the reaction time of a varistor is its physical connection to the circuit or device to be protected. Its intrinsic operating speed is reported to be around 200 ns, but this is limited by its connections. Varistors typically comprise two terminals: an input terminal, which is connected to the incoming power supply; and an output terminal, which is connected to ground. These terminals are usually connected to the circuit or device to be protected and earth (respectively) using flying leads. The use of flying leads, however short, is generally considered to be problematic for two reasons.

Firstly, at high frequencies above say 10 MHz RF coupling will occur between cables on the unprotected and protected sides of the circuit. This means that part of the transient pulse will by-pass the varistor altogether and continue along the power cables to damage the electronic equipment Secondly, the flying leads act as inductors wired in-series with the varistor, thus slowing its reaction time.

An example of a known high energy varistor 10 is shown in partial cut-away view in FIG. 1 of the drawings. The known varistor 10 comprises a plastic insulating housing 12, which can be affixed to the housing of an electronic device using screws (not shown) passing through various screw holes 14. One end of the main body portion 12 comprises a terminal block 16, which has a generally T-shape when viewed from above, the spine 18 of which being used to physically separate a pair of screw connection terminals 20, 22 to which an incoming power cable 24 and a ground cable 26 can be affixed. Inside the main body portion 12, there is a cavity 28, which houses a varistor disc assembly 30 comprising a disc 32 of material, exhibiting the requisite dielectric-conductor property previously described, sandwiched between a pair of metal contact plates 34, which are connected to the terminals 20, 22 internally via fly leads or bus bars 36 (illustrated schematically in FIG. 1).

It will be apparent to the skilled reader that, due to the physical shape and dimensions of the varistor disc assembly 30 within the cavity 28, that the internal flying leads or bus bars 36 are required to make the connections to the terminals 20, 22 and that these act as inductors in the circuit, thus increasing the reaction time of the varistor disc 32. Further, the external power 24 and ground cables 26 will also act as additional inductors, further increasing the reaction time of the disc. In use, one of the terminals 22 will be connected to ground 64 via a cable 26. The other terminal 20 will be connected, via a flying lead 24 to a main terminal 27, which connects the incoming "dirty" power input 23 to an outgoing flying lead, which in-turn connects to a load 25 protected by the varistor 10.

Because the incoming 21 and outgoing power cables 29 are adjacent to each other with no shielding between them (as this is not practical), they will both act as antennas at high frequency and some high frequency coupling (as indicated by radiating lines 31 in the drawing) will occur from the incoming 21 to the outgoing cables 29 thus by-passing the suppression effect of the varistor 10. The reduction in effectiveness of the varistor 10 as a result of this will be very significant at frequencies above say 100 MHz and will depend on the lengths and orientations of the cables 21, 29.

It will be appreciated that whilst this disclosure is written in the context of powerline protection, the invention is equally applicable to signal line applications and should be construed and understood accordingly.

Problems associated with flying leads can be alleviated by adoption of feed-through type assemblies, where a feed-through conductor such as a pin passes through a body of material forming the varistor and serves to conduct the power supply or signal. An international application in the name of AVX Corporation published under no. WO99/67796 provides an example of such a structure. Here, the feed-through extends through a multi-layer capacitor structure whose dielectric apparently forms the varistor. Within the dielectric is a stack of overlapping capacitor plates. One set of plates is connected to the feed-through. That set is interleaved with a set of plates connected to a conductive canister formed as a housing for the device, the canister also providing the required route to ground. The device in question forms part of a heart pacemaker for implantation in the body. The device is not part of a plug and socket connection per se.

Another example of a feed-through type device with a multi-layer capacitor structure and a route to ground formed through a cylindrical housing is provided by U.S. Pat. No. 4,587,589, in the name of Marek.

It can be convenient to incorporate over-voltage protection into an electrical connector such as a plug and socket connection. For example, it would be advantageous to incorporate such protection into the type of plug used to connect electrical devices to a mains supply, especially where the plug in question has an earth pin. The type of structure taught in WO99/67796 and U.S. Pat. No. 4,587,589, in which a conductive canister forms the earth connection for a multi-layer capacitor structure, is not well suited for incorporation into various known types of electrical plug or socket.

The invention is set forth in the appended independent claim. Preferred or optional features of the invention are set forth in the appended dependent claims.

The arrangement according to the present invention can easily be adopted in connectors conforming to existing standards, such as existing mains electrical plugs. The varistor plate of the present invention can be of shallow depth and hence easily incorporated into the housing of such a plug. The apertures in the varistor plate can be made to conform to the existing pin arrangement of the connector. No additional wires as such need be provided in the plug, since connections to the pins are made through the said conductive layers. As compared with the feed-through devices of prior art such as WO99/67796 and U.S. Pat. No. 4,587,589, the use of a connector pin as the earth connection—rather than the provision of an earthing canister around the varistor material—contributes to these advantages. So too does the connection of the pins to regions of the varistor faces, rather than to contact areas on the periphery of the varistor and the bore extending through it, as in this prior art. More than two pins can be accommodated, as for example in the case of a UK mains plug having live, neutral and earth pins. The invention may be embodied by a socket rather than a plug, in which case the pins may be formed by female socket members extending through the varistor plate.

Suitably, the varistor plate comprises a plate (of any suitable shape) of material that is substantially dielectric at low voltages, but which is substantially conductive at high voltages.

The varistor plate is manufactured from a sheet of material that is substantially dielectric at low voltages, but which is substantially conductive at high voltages, such as a Zinc Oxide material doped with various other oxides in proprietary formulations. The low voltage is suitably a designed or normal operating voltage of a connected device, for example, less than 500V, e.g. 277VAC (US 3-phase), 250VAC (UK mains), 220VAC (EU mains), 120VAC (US mains), 95VAC (analogue telephone lines), 48VDC (telecoms), 28VDC (military vehicles), 24VDC (vehicles), 12VDC (vehicles), 9, 3 or 1.5VDC (electronics), etc., whereas the high voltage suitably corresponds to any high voltage transient superimposed on the line. This would normally be in excess of 1 kV, and could be attributable to e.g. switching transients but the invention is aimed more specifically at transients including high frequency high energy content such as EMP (electromagnetic pulses) or EMI (electromagnetic interference) which could typically be up to 300 kV.

The varistor plate is interposed between, and electrically connected to, the first and second conductor layers disposed on opposite faces of the sheet. The conductor layers may comprise a metal surface coating layer deposited onto; or a metal disc adhered, brazed, soldered or otherwise electrically connected to, opposite sides of the varistor plate.

The conductor layers are electrically isolated from one another by the varistor plate in normal use (that is to say, when the varistor plate is in its dielectric state).

Thus, at low voltages, the varistor plate electrically insulates the conductor layers from one another, thus forming an open circuit condition between the first and second pins. However, at high voltages, the varistor plate becomes electrically conductive, thus forming a closed-circuit condition permitting the EMP or high voltage transient pulse to be shorted from the first pin to ground via the varistor plate.

Connection of the first pin to the first conductive layer and/or of the second pin to the second conductive layer may be accomplished via a direct connection, e.g. by soldering, brazing or the like. In other embodiments of the invention, a mechanical-electrical connection is used, such as a conductive bush or gasket, a screw fitting or the like, a sprung connector or the like.

In preferred embodiments of the invention, the varistor plate and the two conductor layers are arranged substantially perpendicularly to a longitudinal axis of the electrical connector.

The electrical connector may comprise three or more pins. It may for example be intended for use in a three-phase electrical system, where the three phases may require protection from EMP in a single device. This may provide the additional benefit of automatically disconnecting more than one conductor from a protected device or circuit, even when the EMP is only present at one conductor: this suitably occurs because in an EMP event on any of the pass-through conductors sharing a common varistor plate, the entire varistor plate becomes conductive, albeit temporarily, thus automatically shorting all of the feed-through conductors to ground simultaneously. This configuration may advantageously avoid load imbalances, or lack of synchronisation, which may occur where each conductor is protected independently.

It will be appreciated that one or more advantages may flow from the invention, such as the following:

because the pins are able to be connected directly to the conductive layers on the varistor plate, there may be no flying leads connecting the varistor plate to the circuit either within the varistor assembly housing or via external connections. This suitably improves the reaction time of the varistor because of negligible inductance of the connection arrangement.

because the varistor plate and its conductive layers (the varistor plate assembly) has an inherent capacitance, and a very low (if not negligible or zero inductance), the need for a for a downstream L-C filter circuit may be redundant or reduced. The reason for this is that an L-C circuit is traditionally employed to "slow" the EMP pulse so that the varistor can react in sufficient time. However, as in the case of the invention, the inductance of the varistor is considerably reduced, thus increasing its reaction and obviating the need for a "slowing" circuit. This can greatly simplify the implementation of EMP protection in electronic or electrical circuits and/or devices.

the intrinsic capacitance of the varistor plate coupled with the fact that it is mounted in a feed-though configuration will provide a filtering function offering typically 50 db of insertion loss at 1 GHz. This filtering feature will remove high frequency noise from the feedthrough conductor by shunting it to ground and will occur even if the noise voltage is below the threshold or trigger voltage of the varistor.

A further problem that is known to exist with varistors is their degradation over time. Initially, and as previously explained, the varistor plate is substantially dielectric (an electrical insulator) at low voltages, and undergoes a sharp dielectric breakdown above a specified threshold voltage, thus rendering it electrically conductive. However, the permanent application of a voltage across the varistor plate, as happens in normal use, is believed to lead to electromigration of species and impurities within the disc, which eventually renders the disc slightly conductive. This results in Ohmic resistance, which tends to heat the varistor plate, thus accelerating the electromigration, and thus accelerating the disc's degradation. It will be appreciated that if the varistor plate has a significant conductivity, it will tend to leak current to ground, thus degrading the protection conferred thereby, and also leading to a potentially permanent fault situation. Due to the resistance heating that occurs when the varistor plate begins to degrade, it is possible to detect the onset of failure by monitoring the temperature of the varistor plate, and by taking appropriate measures (e.g. replacement) as and when necessary. However, this requires regular monitoring of the varistor plate, and if the varistor plate fails suddenly (i.e. in a shorter time than the expected service interval), the protection afforded by the varistor can be compromised. A need therefore exists for a solution to this problem.

Certain embodiments of the invention therefore provide a solution in the form of a thermally-activated override, which, when the temperature of the varistor plate begins to rise, a permanently disconnects the varistor plate from the circuit.

In a preferred embodiment of the invention, the thermally-activated override is implemented using a bimetallic disc electrically connected in-series between the varistor plate and ground. The bimetallic disc is suitably configured to undergo a one-way shape change upon heating, that is to say, having a first shape at first (relatively low) temperature and a second shape at a second (relatively higher) temperature, but which is configured such that when the temperature returns to the first temperature the bimetallic disc does not return to its first shape. A one-way, thermally-induced shape property can be used to form an electrical connection between the varistor plate and ground at the low temperature, but to permanently disconnect the varistor plate from ground if the varistor plate is heated to, or above, the second temperature.

In certain embodiments of the invention, the bimetallic disc can be part-spherical, and/or conical and/or may additionally comprise a circular ridge. Such a configuration may enable the bimetallic disc to "snap" from its first shape to a second shape upon heating above a threshold temperature, and to remain "snapped" in the second shape regardless of subsequent cooling. This provides a permanent disconnect of the varistor plate in the event of heating above a specified threshold temperature.

Additionally or alternatively, the thermally-activated override is implemented using a one-way shape memory alloy electrically connected in-series between the varistor plate and ground. One-way shape memory alloy is suitably configured to undergo a one-way shape change upon heating, that is to say, having a first shape at first (relatively low) temperature and a second shape at a second (relatively higher) temperature, but which is configured such that when the temperature returns to the first temperature the one-way shape memory alloy does not return to its first shape. As described above, this one-way, thermally-induced shape property can be used to form an electrical connection between the varistor plate and ground at the low temperature, but to permanently disconnect the varistor plate from ground if the varistor plate is heated to, or above, the second temperature.

The one-way shape memory alloy can be of any suitable configuration, for example a helical spring, which shortens upon heating above a specified temperature, but which does not return to its original shape upon subsequent cooling. Suitable one-way shape memory alloys for this purpose include, but are not limited to, certain Ni—Ti alloys. In another embodiment, the shape memory alloy can be used to actuate a more conductive spring contact, for example, as a trigger or as part of a release mechanism.

A further feature that could be added to the invention is that of a monitor point to indicate when the varistor has failed (i.e. been disconnected). Suitably, this may be implemented by a wire electrically connected to the live side of the varistor plate and to an external terminal on the varistor case for monitoring purposes. Under normal operating conditions, this wire will present a "live" e.g. 240V signal, but when the disconnect device has been actuated, this signal voltage will change to 0V, indicating a disconnect. The external terminal could be connected to a sensing circuit, which relays the status of the signal to a remote monitoring station, or it could be connected to an indicator light, such as a neon, built into the varistor housing. The indicator light, where provided, may additionally comprise a protection circuit to protect it from EMP or other high voltage pulses.

Such a configuration may enable the indicator light to be illuminated if the varistor is functioning correctly and go out (extinguish) if the varistor plate became disconnected.

Various embodiments of the invention shall now be described, by way of example only, with reference to the accompanying drawings in which.

Figure 10:
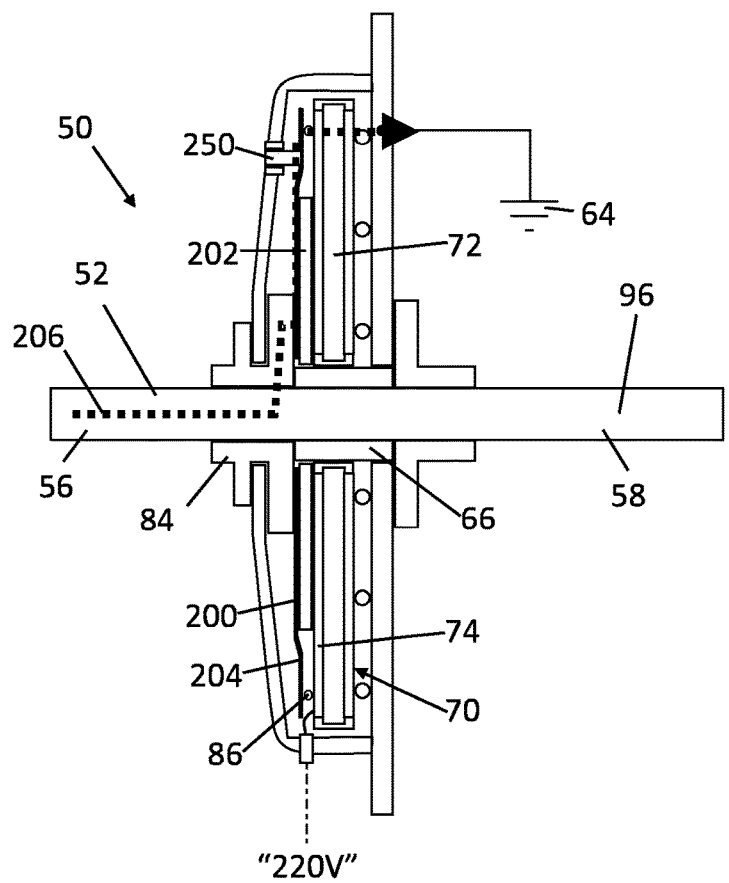
Figure 11:
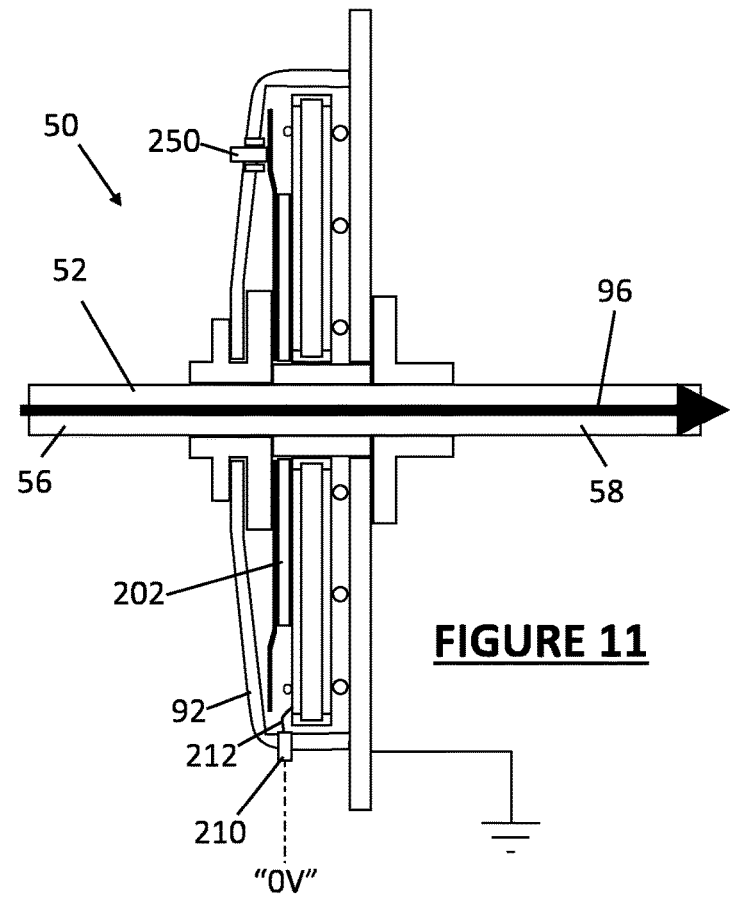
Figure 12:
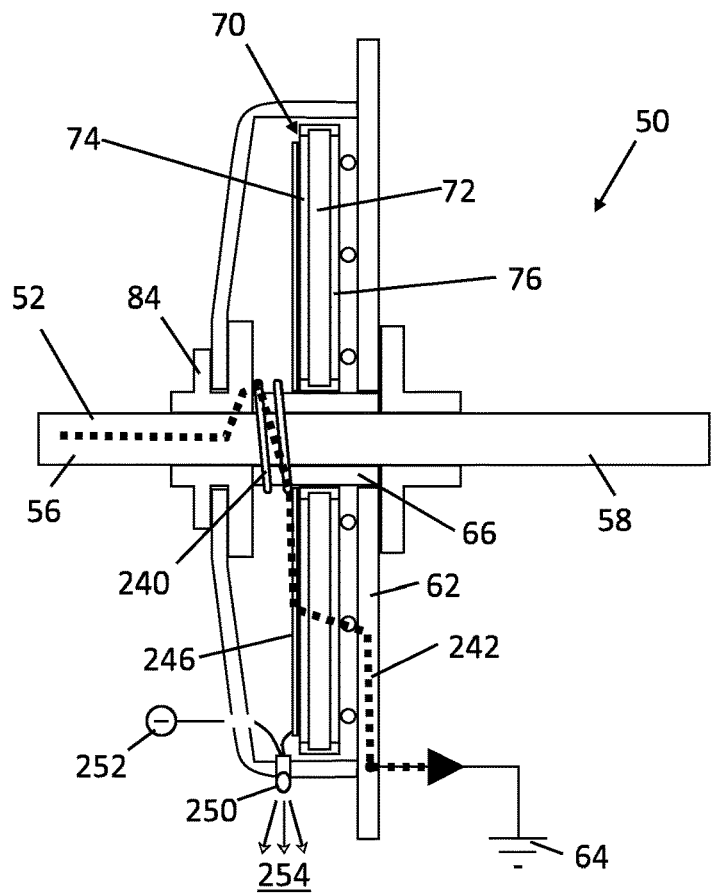
Figure 13:
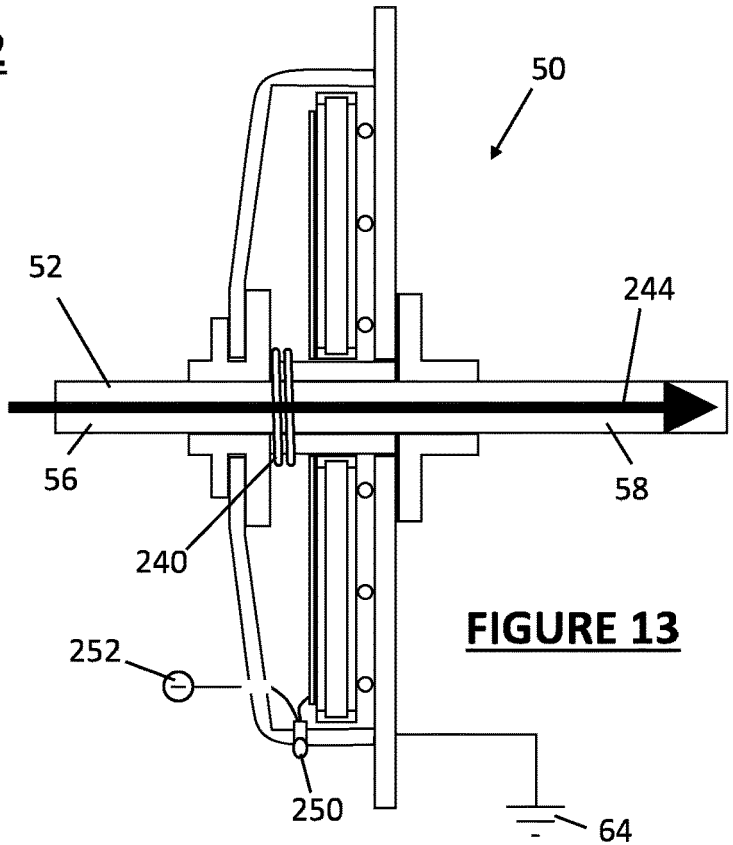

FIGS. 10 and 11 are schematic cross-sections of a further varistor device having features which may be adopted in embodiments of the invention, further comprising a first type of thermally-actuated disconnect and a test terminal, in normal, and permanent disconnect modes, respectively; and FIGS. 12 and 13 are schematic cross-sections of another varistor device having features which may be adopted in embodiments of the invention, further comprising a second type of thermally-actuated disconnect and a status indicator, in normal, and permanent disconnect modes, respectively.

Figure 1:
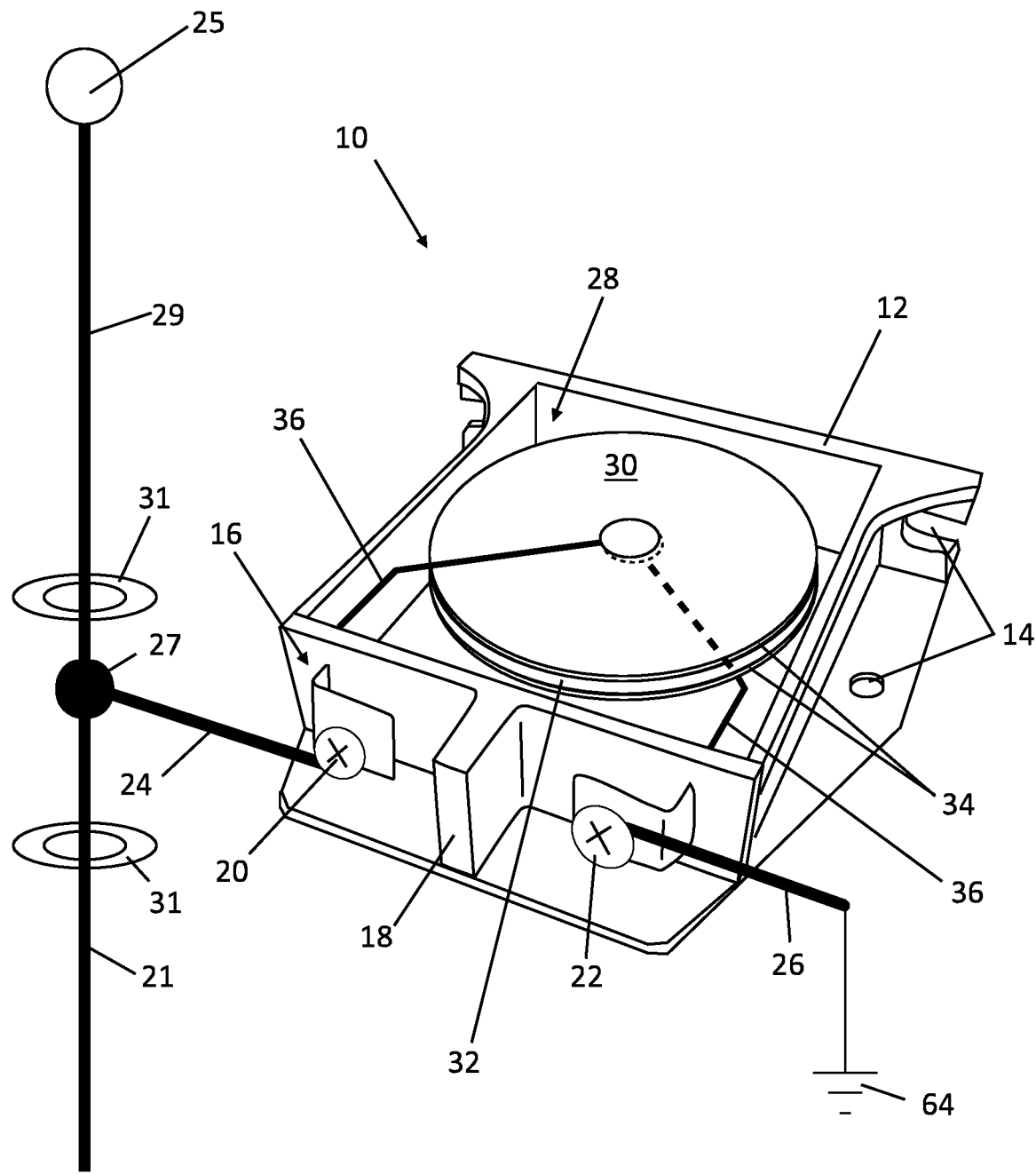
FIG. 1 is a partial cut-away view of a known varistor.
Figure 2:
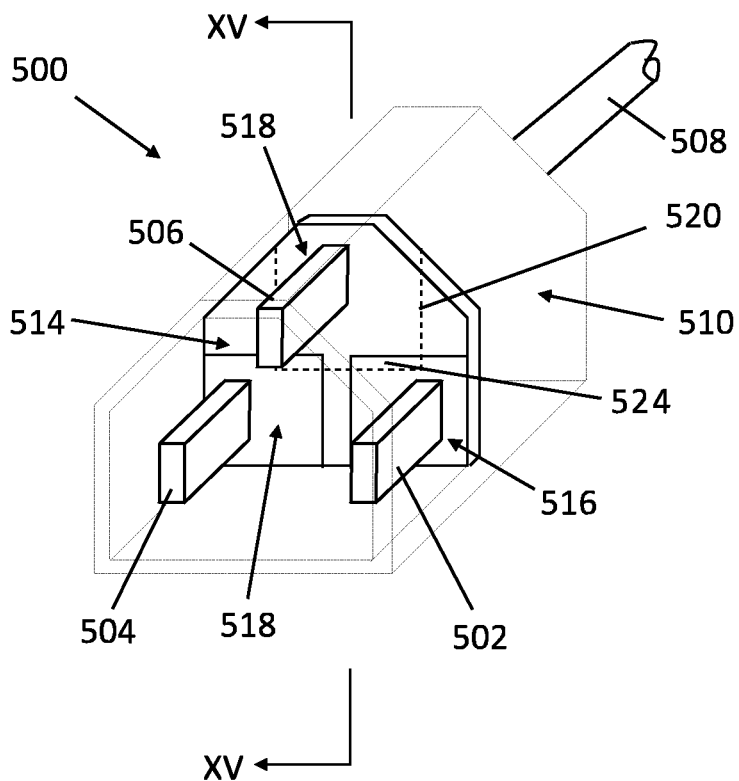
FIG. 2 is a schematic perspective view of a terminal/plug in accordance with the invention.
Figure 3:
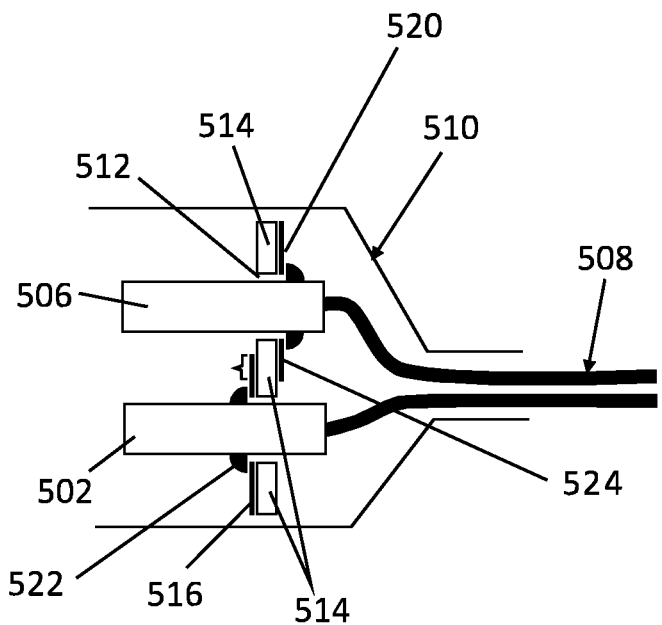
FIG. 3 is a schematic partial cross-section of the terminal/plug of FIG. 2 on XV-XV.

FIGS. 2 and 3 represent an embodiment of the present invention. This takes the form of an electrical plug 500. In this example the plug is a power supply plug for connection to a mains electrical supply. More specifically it is a UK-type three-pin mains plug. Other embodiments may comprise mains electrical plugs of other types, such as an IEC-type "kettle plug" etc., or may comprise plugs for different purposes, including other types of plug for supply of power and also plugs for use in data exchange. The invention may alternatively be embodied in a different form of connector, such as a socket rather than a plug.

The plug 500 has a live pin 502, neutral pin 504 and earth pin 506, all connectable in conventional manner to respective conductors of a three-core cable 508. The plug 500 also has an insulative casing 510.

The pins 502, 504, 506 all extend through respective through respective apertures 512 in a varistor plate 514, whose outer shape is configured to fit within the housing 510. A first side of the varistor plate 514 is tinned in regions 516, 518 surrounding the live 504 and neutral 506 pins, whereas the opposite side of the varistor plate 514 is tinned in a region 520 surrounding the earth pin 506. Each pin 502, 504, 506 is electrically connected, (e.g. by soldering 522) to its respective tinned area 516, 518, 520.

The tinned areas are electrically conductive. Instead of being formed by tinning they may in other embodiments take a variety of different forms. They may in particular comprise:

a metal surface coating layer deposited onto the varistor plate;
a layer of tinning;
a metal sheet adhered to the varistor plate;
a metal sheet brazed to the varistor plate;
a metal sheet soldered to the varistor plate;
a metal sheet clamped to the varistor plate.

In normal use, the varistor plate 514 is electrically insulative, and so is invisible to the pins. That is, it does not provide a conductive path from one pin to another. However, if a high-voltage pulse arrives on the live or neutral circuit, varistor plate 514 will become conductive, thus shorting the pulse to the earth pin 506, and hence to ground. It will be noted that the tinned regions on the first side of the varistor plate slightly overlap, in an overlap region 524, with the tinned regions on the opposite side of the varistor plate, and this is to provide as short as possible a conduction pathway through the varistor plate 512.

A thermally-activated override device may additionally be fitted to protect the connector against the effects of degradation of the varistor. The construction and operation of suitable thermally-activated override devices will be described below in relation to other varistor devices.

In normal operation, i.e. when the input voltage is within design parameters and lower than the dielectric breakdown potential of the varistor plate 514, current flows through the plug to a point of usage. However, during an EMP event, that is to say, when the input voltage at the live pin 502 or the neutral pin 504 exceeds the dielectric breakdown potential of the varistor plate 514, the varistor plate 514 becomes electrically conductive, thus forming a current path through the varistor plate from one face to the other between (a) the live and neutral pins 502, 504 and (b) the ground pin 506. In this situation, current through the live and neutral pins is diverted via the ground pin 506 to ground, thus shorting the EMP and protecting a device connected to the plug 500 from the electromagnetic pulse.

It will be noted that there are no fly leads connecting the components and that the varistor plate assembly is constantly connected between the live/neutral pins 504, 506 and the ground pin 506. The arrangement—making use as it does of the pins of the plug—is simple to manufacture, mechanically robust and has low inductance.

The assembly comprising the varistor plate 514 may in some embodiments be supplied for fitting to an existing plug, to provide it with protection. It may be a retro-fit device, and may be made and sold separately from the plug itself.

Further varistor devices will be described below. These devices mostly are not electrical connectors as such but possess features which can be adopted in embodiments of the present invention, including suitable thermally-activated override devices.

Figure 4:
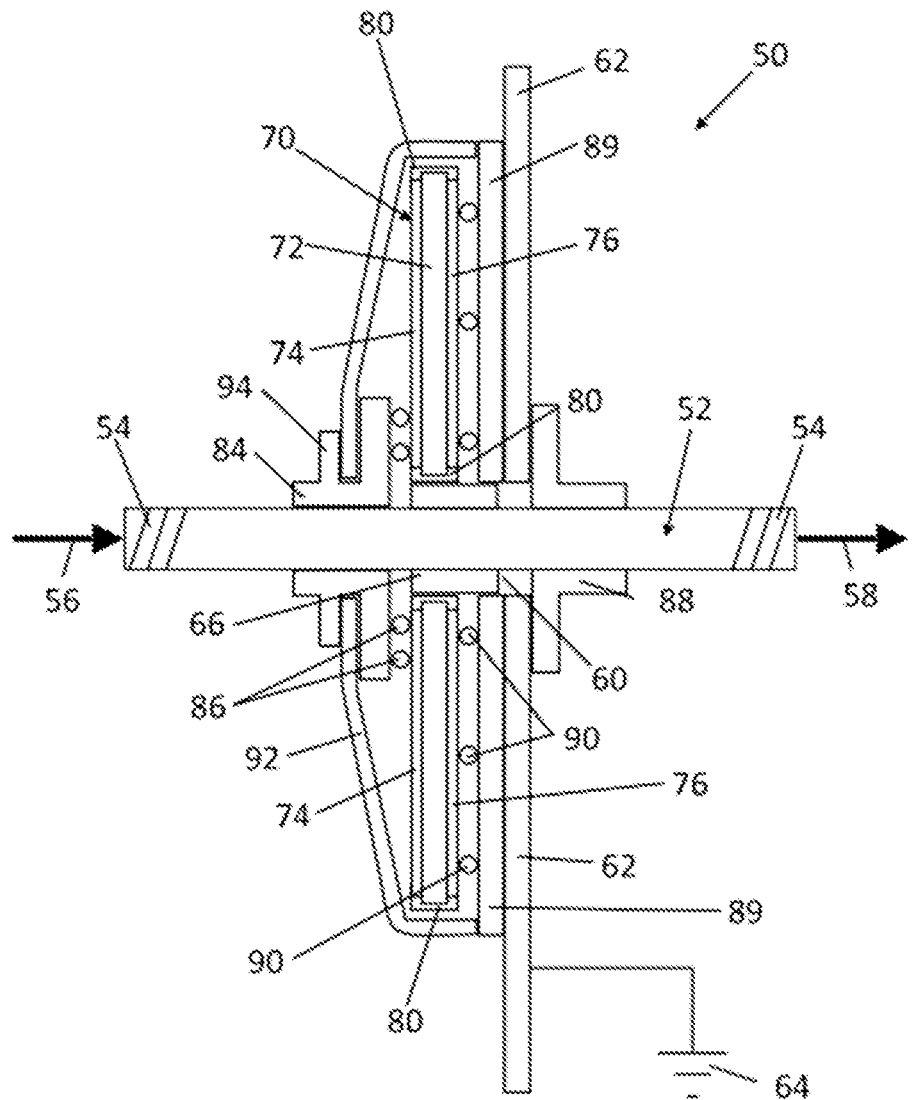
FIG. 4 is a schematic cross-section of an embodiment of a further varistor device having some features which may be used in embodiments of the invention.
Figure 5:
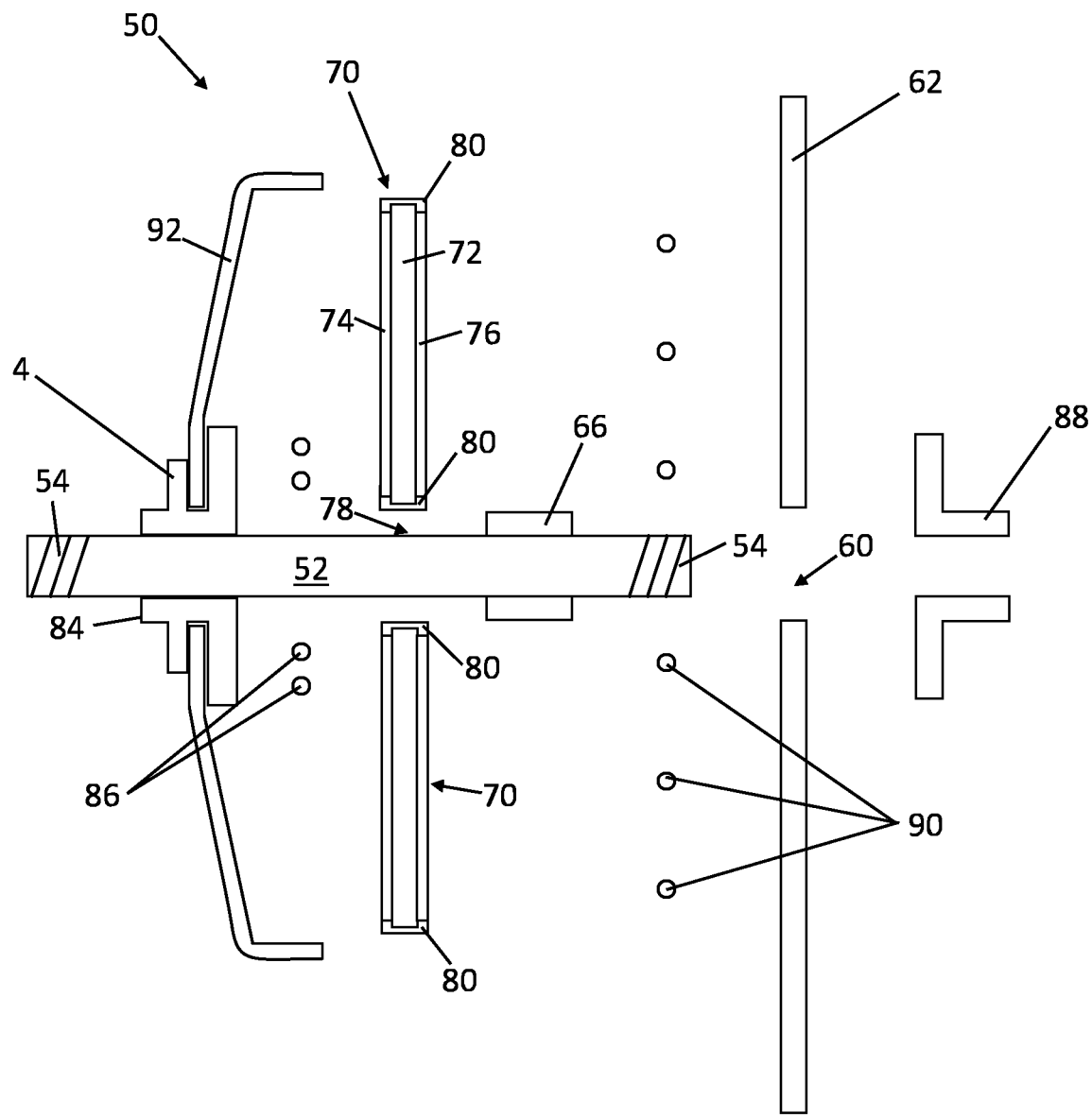
FIG. 5 is a schematic exploded cross-sectional view of the varistor of FIG. 4.

Referring to FIGS. 4 and 5 of the drawings, a varistor 50 comprises a feed-through conductor 52 formed as a metal rod with screw-threaded ends 54 to which input 56 and output 58 conductors are affixed, in use. The input conductor 56 is connected to an incoming power supply, whereas the output conductor 58 is connected to the power input of a device or circuit (not shown) to be protected by the varistor 50. Under normal operating conditions, electrical current flows through the feed-through conductor 52, substantially uninhibited, between the terminals 54.

The feed-through conductor 52 is arranged to extend through an aperture 60 in a metal side wall 62 of the device to be protected. The metal side wall 62 is grounded 64 in the usual way, and the metal side wall 62 is electrically insulated by a dielectric bush 66 that is interposed between the feed-through conductor 52 and the periphery of the aperture 60 in the metal side wall 62. Thus, there is no direct electrical connection between the feed-through conductor 52 and the grounded metal side wall 62.

A varistor plate assembly 70 is also provided, which comprises a disc 72 of material, exhibiting the requisite dielectric-conductor property previously described, sandwiched between a pair of metal contact plates 74, 76. The varistor plate assembly 70 has a through hole 78 in the middle of it, through which the feed-through conductor 52 extends. The metal contact plates 74, 76 are electrically insulated from one another around their outer peripheries, and around the through hole 78 by 1) their outer diameters being smaller than that of the varistor plate 72; 2) the diameter of the through holes in the metal discs 74, 76 being larger than that of the varistor plate 72; and 3) by annular dielectric parts 80 extending around the outer periphery of the varistor plate assembly, and around the interior of the central hole 78.

A first one of the metal contact plates 74 is electrically connected to the feed-through conductor 52 by a metal locking ring 84, which screws tight against the varistor plate assembly 70, sandwiching a set of resiliently deformable annular contact rings 86 (e.g. made from metal mesh) between the locking ring 84 and the first metal contact plate 74 of the varistor plate assembly 70. This forms a permanent electrical connection between the feed-through conductor 52 and the first metal contact plate 74. In other embodiments (not shown), the first metal contact plate 74 is soldered or brazed to, or formed integrally with, the locking ring 84, to form the aforesaid permanent electrical connection.

The metal locking ring 84 bears against a dielectric locking ring 88 located on the opposite side of the varistor plate assembly 70. The dielectric locking ring 88 clamps the metal side wall 62 against a back plate 89 (not shown in the remaining drawings for clarity) which bears against the second metal disc 76 of the varistor plate assembly 70 with a second set of resiliently deformable annular contact rings 90 (e.g. made from metal mesh). This configuration forms a permanent electrical connection (in normal use) between the second metal disc 76 of the varistor plate assembly 70 and ground 64.

A protective casing 92 is also provided to enclose the varistor plate assembly 70 and this is held in place by a locking ring portion 94 of the metal locking ring 84. The interior of the casing 92 is filled with potting material to environmentally protect the varistor plate, provide good insulation distances over surfaces, particularly the input side which could see high transient voltages and must not flashover.

Figure 6:
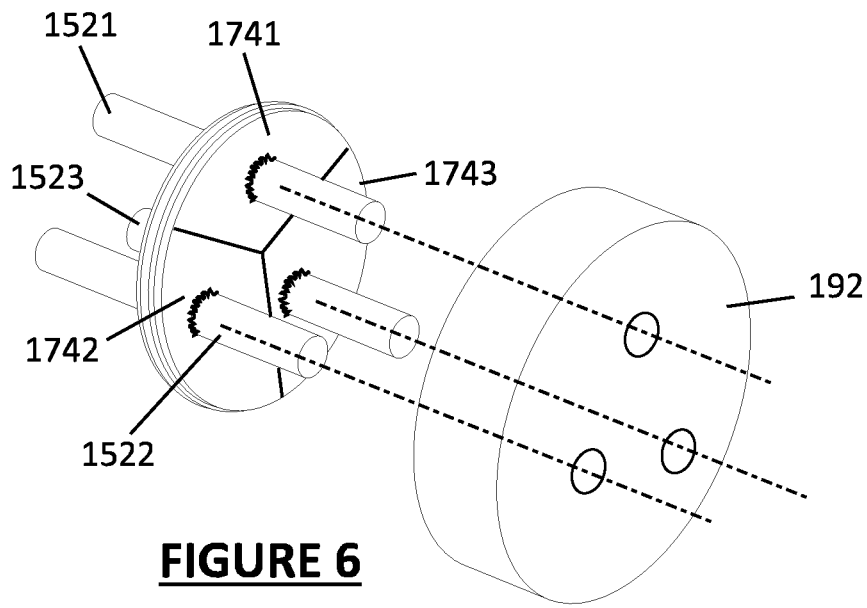
FIG. 6 is a schematic perspective exploded view of an embodiment of a varistor with multiple feedthrough connections having some features which may be adopted in embodiments of the invention.
Figure 7:
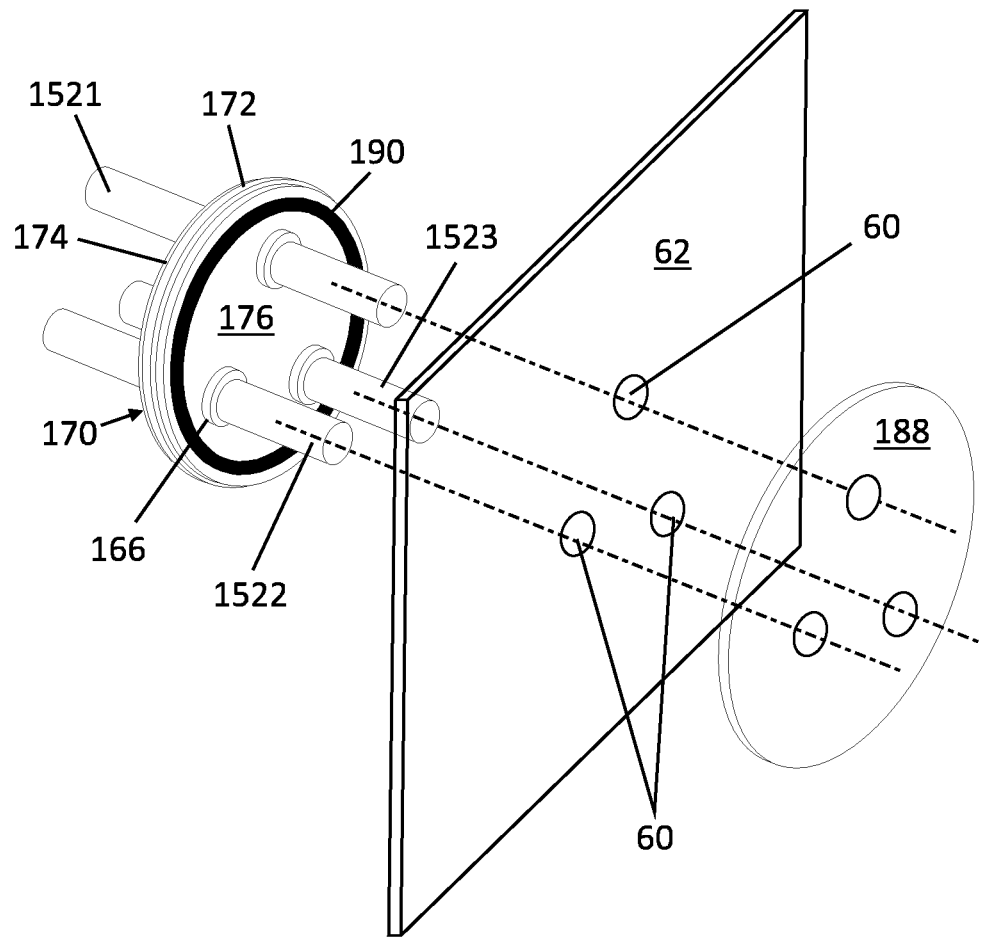
FIG. 7 is a schematic perspective exploded view of the varistor of FIG. 6 viewed from the opposite side.

A further varistor device 100 is shown in FIGS. 6 and 7 of the drawings and comprises three feed-through conductors 1521, 1522, 1523 sharing a common varistor plate assembly 170. Each of the feed-through conductors 1521, 1522, 1523 extends through its own through hole (not visible) in the varistor plate assembly 170. As before, the varistor plate assembly 170 comprises a varistor plate 172 sandwiched between a pair of conductor plates 174, 176. In this case, the first conductor plate 174 is formed from three pieces 1741, 1742, 1743 corresponding to each of the feed-through conductors 1521, 1522, 1523, which pieces are electrically insulated from one another. Each of the feed-through conductors 1521, 1522, 1523 are brazed to their respective first conductor plate portions 1741, 1742, 1743 to form a permanent electrical connection therebetween.

FIGS. 6 & 7 show an example of three feedthrough conductors, in which all of the terminals are "live" terminals. In practice, however, if one of the three conductors were an "earth", then the electrode configuration may be equivalent to that described above with reference to FIGS. 2 and 3, with one earth pin being connected to one side of the varistor plate 172 and the live pins being connected to the other side of the varistor plate 172, forming an electrical connector embodying the present invention.

The second conductor plate 176 is permanently electrically connected to a grounded earth plane 62 via a resiliently deformable conductor ring 190, and dielectric bushes 166 as described previously, are used to insulate the second conductor plate 176 from the pass-through conductors 1521, 1522, 1523. A clamping disc 188 bears against a cover 192 as previously described to clamp/hold the whole assembly together.

Figure 8:
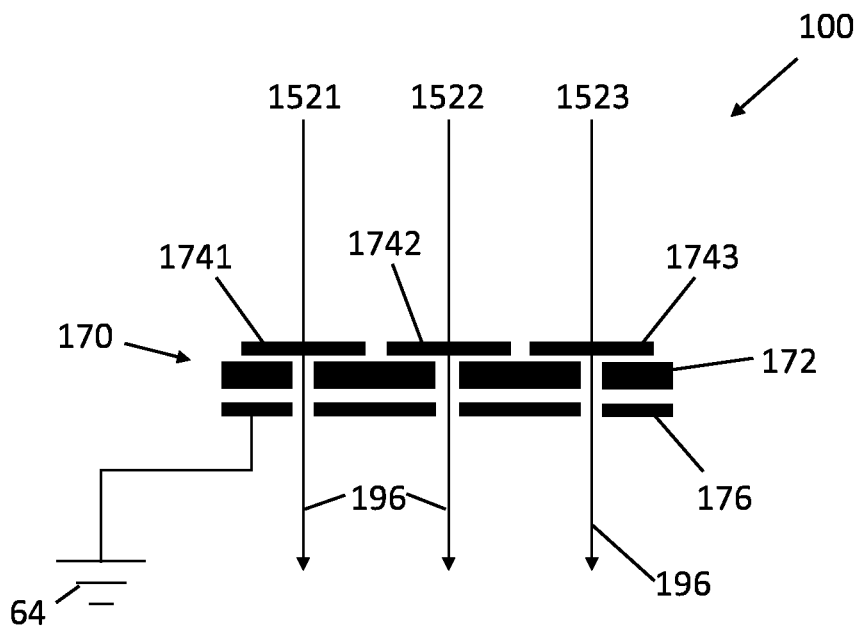
FIG. 8 is a schematic diagram showing the current flow path of the varistor of FIGS. 6 and 7 in a normal operational state.
Figure 9:
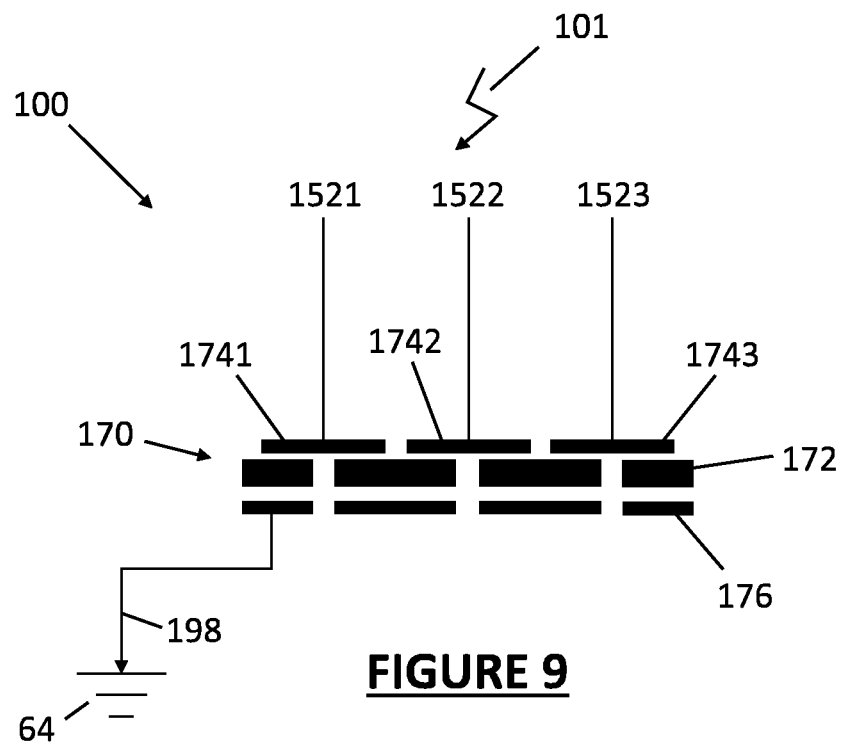
FIG. 9 is a schematic diagram showing the current flow path of the varistor of FIGS. 6 and 7 during an EMP or transient pulse event.

The operation of the varistor 100 of FIGS. 6 and 7 is shown schematically in FIGS. 8 and 9 of the drawings. In FIG. 8, the varistor 100 is in normal operation, i.e. when the input voltage is within design parameters and lower than the dielectric breakdown potential of the varistor plate 172, current 196 flows directly through each of the feed-through conductors 1521, 1522, 1523, as indicated schematically in FIG. 8. However, during an EMP event 101, that is to say, when the input voltage at any one of the input terminals exceeds the dielectric breakdown potential of the varistor plate 172, the whole varistor plate 172 becomes electrically conductive, thus forming a current flow path between the each of the first varistor plate portions 1741, 1742, 1743 and the second conductor plate 176. In this situation, as shown in FIG. 9 of the drawings, the current 198 flows from the input terminals to ground 64. Thus, the configuration shown in FIGS. 6 to 9 of the drawings provides simultaneous protection for any conductor in the event of an EMP event 101 on any of the conductors. This configuration may be of use, for example, in protecting a three-phase power supply, with the L1, L2 and L3 inputs being connected respectively to feed-through conductors 1521, 1522, 1523. Of course, where this type of protection is not needed, it would be possible to use several varistors 50 as described in relation to FIGS. 2 to 5 above, albeit with a separate varistor 50 on each of the L1, L2 and L3 phases.

Varistor devices further comprising thermally-activated disconnects are shown in FIGS. 10 to 13 of the drawings, and are largely the same as the devices shown in FIGS. 4 and 5 of the drawings. Identical reference signs have been used, therefore, to identify identical features, to avoid unnecessary repetition.

Referring to FIGS. 10 and 11 of the drawings, a varistor 50 comprises a feed-through conductor 52 having input 56 and output 58 ends as previously described. A conductive bush 84 connects the feed-through conductor to a bimetallic, or one-way shape-memory alloy disc 200, which is electrically insulated from the feed-through conductor 52 by the insulator tube 66 previously described, and is spaced apart from the input conductor disc 74 of the varistor plate 70 by an annular insulator disc 202, leaving a peripheral edge portion 204 extending outwardly beyond the annular insulator disc 202. The bimetallic, or one-way shape-memory alloy disc 200 may be tinned or coated in some way to improve its electrical conductivity.

Bimetallic discs are widely used in commercial thermostats (e.g. for electric kettles or hair dryers), and most use conical snap action discs (without a hole in the middle). However, the operation of these is always to actuate a spring contact which joins two discrete contacts. This of course would introduce an inductive connection and would defeat the benefit of the invention. In aspects of the invention, a conical disc as part of the connection path has been deliberately selected from amongst other alternatives, to provide a 360-degree co-axial connection to the varistor plate, which suitably gives a substantially non-inductive connection when the varistor is in-service. In other words, the conical discoidal form of the bimetallic disc permits a 360-degree co-axial connection to the varistor plate thus preserving its low inductance connection. In comparison, traditional two-terminal thermal disconnect devices would introduce inductance which would reduce the operating speed of the varistor.

The peripheral edge portion 204 of the bimetallic, or one-way shape-memory alloy disc 200 connects, in normal use, as shown in FIG. 10, to the input conductor disc 74 of the varistor plate 70 via a conductive ring 86, and thus electrical current, in an over-voltage situation (as shown in FIG. 10) is able to be grounded to earth 64 as indicated schematically by arrow 206.

Over time, the varistor plate 72 may degrade, leading to it having a finite resistance at low voltages, which causes it to heat up by resistive heating—the varistor plate 72 being permanently connected to the mains supply voltage and ground. Upon heating, as shown in FIG. 11 of the drawings, the bimetallic, or one-way shape-memory alloy disc 200 "snaps" into a second shape, in which the peripheral edge portion 204 of the bimetallic, or one-way shape-memory alloy disc 200 moves away from the conductive ring 86, thus breaking the connection between the varistor plate 70 and the input power supply. Now, of course, the over-voltage protection provided by the invention is removed (as shown by arrow 208 in FIG. 11), but at the same time, the input mains power is not being permanently shorted to ground 64 via the now-failed varistor plate 72.

However, the varistor 50 of the invention is provided with a test terminal 210 in the casing 92, which is connected via a fly lead 212 to the live side 74 of the varistor plate 72. Thus, as can be seen by comparing FIGS. 10 and 11, the voltage signal at the test terminal 210 goes from mains voltage (e.g. 220V, in this example) in FIG. 10, to 0V. Thus, if a remote monitoring system (not shown) in connected to the test terminal 210, it is possible to monitor the status of the varistor 50, and therefore it is possible to determine, without having to disassemble and test the varistor 50, whether the varistor plate 70 is operation or not.

A further possible addition comprises a mechanical indicator and/or push-button reset, which comprises an insulative pin 250 extending through the housing and in contact with the bimetallic, or one-way shape-memory alloy disc 200. In the normal state, as shown in FIG. 10, the pin 250 is retracted within the housing, but once the bimetallic, or one-way shape-memory alloy disc 200 has "snapped" to its second shape, as shown in FIG. 11, the pin projects from the housing, this providing a visual indication of the status of the varistor. The pin 250 can be depressed, if required, to reset the bimetallic disc 200.

FIGS. 12 and 13 of the drawings illustrate another example of the invention fitted with a thermally-actuated disconnect. In FIGS. 12 and 13 of the drawings, a varistor 50 in accordance with the invention comprises a feed-through conductor 52 having input 56 and output 58 ends as previously described. A conductive bush 84 connects the feed-through conductor to a helical spring 240 manufactured of a shape-memory alloy, such as from a Ni—Ti alloy. The shape-memory spring 240 has a one-way shape memory effect, and is thus formed above its transition temperature, in the shorter form, as shown in FIG. 13 of the drawings. It is then held in that shorter form, and allowed to cool below its transition temperature, whereupon the shape-memory spring 240 is then deformed (elongated) to the longer form shown in FIG. 12 of the drawings. The result is now that below the transition temperature (which transition temperature is, of course, selected to correspond to a varistor plate temperature that indicates the onset of failure) the shape-memory spring adopts the longer form shown in FIG. 12 of the drawings. However, when the varistor plate 70 begins to fail, and hence heats up, in normal use due to resistive hearting, so too does the shape-memory spring 240. Eventually, the temperature of the shape-memory spring 240 may exceed the shape-memory transition temperature, causing it to adopt the shorter form, shown in FIG. 13 of the drawings, thus disconnecting the varistor plate 70 from the circuit. Due to the absence of a voltage across the varistor plate 70, and hence the absence of further resistive heating, the varistor plate 72 will now eventually cool. However, because the shape-memory spring 240 has a one-way shape-memory, it will not revert to its longer form, thus permanently disconnecting the varistor plate 72 from the circuit.

Due to the inductance of the helical spring, this example is more suitable for lower frequency applications such as lighting suppression. Other shapes of shape memory alloy, such as discs or blocks, may be more suitable for higher frequency applications such as EMP and IEMI.

For the sake of completeness, the current flow path, during a power spike, is illustrated in FIGS. 12 and 13 of the drawings by arrows 242 and 244. In FIG. 12, the varistor plate 72 is fully operational, and current is diverted to ground through the conductive bush 84, the shape-memory spring 240 and a conductor plate 246, through the varistor plate 70 and to ground 64, via the casing 62. However, once the varistor plate 70 has failed (heated above the shape-memory alloy's transition temperature), as shown in FIG. 13 of the drawings, the shape-memory spring 240 has shortened, thus disconnecting the varistor plate assembly 70 from the circuit and preventing a permanent connection to ground.

As described previously, the over-voltage protection provided by the invention is removed (as shown by arrow 244 in FIG. 13), but at the same time, the input mains power is not being permanently shorted to ground 64 via the now-failed varistor plate 72.

However, the varistor 50 of the invention is provided with an indicator light 250 in the casing 92, which is connected via a fly lead 212 to the live side 74 of the varistor plate 72 and to a common, or negative connection 252. The common connection can alternatively be connected to the earth (ground) side of the varistor housing to avoid the need for a separate external connection. Thus, as can be seen by comparing FIGS. 12 and 13, the indicator light is illuminated 254 during normal operation, or extinguished once the varistor plate 72 has failed. Thus, it is possible to visually monitor the status of the varistor 50, and therefore it is possible to determine, without having to disassemble and test the varistor 50, whether the varistor plate 70 is operation or not.

The invention is not restricted to any particular specific details of the foregoing embodiments, which are exemplary.

The invention claimed is:

1. A protection device for incorporation into an electrical connector (500), the protection device comprising a varistor plate (514) having first and second faces and having:
    a first through-going aperture for receiving a live (502) or neutral (504) pin of the electrical connector (500) and a first conductive layer on the first face of the varistor plate for electrically connecting the first face of the varistor plate to the live (502) or neutral (504) pin;
    a second through-going aperture for receiving a ground pin of the electrical connector and a second conductive layer on the second face of the varistor plate for electrically connecting the second face of the varistor plate to the ground pin (506), wherein at least one of the first conductive layer or the second conductive layer comprises a metal surface coating layer deposited onto the varistor plate (514),
    so that in use, and in response to an excessive voltage across the live (502) or neutral pin (504) and the ground pin (506), the varistor plate (514) will conduct electricity from the live (502) or neutral (504) pin to the ground (506) pin.

2. The protection device of claim 1, in which the first and/or the second conductive layer(s) comprises
    a layer of tinning.

3. The protection device of claim 1, in which the first pin (502, 504) is connected to the first conductive layer and/or the second pin (506) is connected to the second conductive layer by any one or more of the group comprising: soldering, brazing;
    and a conductive bush (84).

4. The protection device of claim 1, additionally comprising a third through-going aperture for receiving a third pin and connecting the third pin to a third conductive layer on the first face of the varistor plate (514).

5. The protection device of claim 1, wherein the varistor plate (514) comprises a sheet of material that is substantially dielectric at low (normal operating) voltages, but which is conductive at high voltage, the high voltage corresponding to that of an electromagnetic pulse or IEMI pulse, that is substantially between 1 kV and 300 kV.

6. The protection device of claim 1, further comprising a one-way thermally-activated override adapted, in use, to permanently disconnect the varistor plate (514) from the circuit once the temperature of the varistor plate (514) has exceeded a predetermined temperature.

7. The protection device of claim 6, wherein the thermally-activated override comprises any one or more of the group comprising:
a bimetallic disc electrically connected in-series between the varistor plate (514) and ground, the bimetallic disc being configured to undergo a one-way shape change upon heating so as to form an electrical connection between the varistor plate (514) and ground below the predetermined temperature, but to permanently disconnect the varistor plate (514) from ground if the varistor plate (514) is heated to, or above, the predetermined temperature, the bimetallic disc being configured, in use, to snap from its first shape to its second shape upon heating above the predetermined temperature, and to remain snapped in the second shape regardless of subsequent cooling, and
a one-way shape memory alloy element (200) electrically connected in-series between the varistor plate (514) and ground, the one-way shape memory alloy element (200) being configured to undergo a one-way shape change upon heating.

8. The protection device of claim 7, wherein the shape-memory alloy (200) comprises a helical spring (240).

9. The protection device of claim 1, further comprising any one or more of the group comprising: a test terminal (210) electrically connected to the first side of the varistor plate (514) and a sensing circuit operatively connected to a test terminal (210).

10. The protection device of claim 1, wherein the first conductive layer overlaps the second conductive layer.

11. The protection device of claim 1, wherein the first conductive layer surrounds the first pin (502, 504) but is separated from the second pin (506), and the second conductive layer surrounds the second pin (506) but is separated from the first pin (502, 504).

12. An electrical connector (500) comprising the protection device of claim 1, the electrical connector (500) comprising at least two pins (502, 504, 506) including a first pin which is the live (502) or neutral (504) pin and a second pin which is the earth (506) pin, the first (502, 504) and second (506) pins extending through respective apertures (512) in the varistor plate (514) which has first and second faces, wherein the first conductive layer on the first face of the varistor plate (514) connects electrically to the first pin (502, 504) and the second conductive region on the second face of the varistor plate (514) connects electrically to the second pin (506), so that in response to an excessive voltage across the first (502, 504) and second (506) pins the varistor plate (514) will conduct electricity between the first (502, 504) and second (506) pins.

13. The electrical connector (500) of claim 12, which is a plug (500), the pins (502, 504, 506) being connector pins (502, 504, 506) of the plug (500) for engagement with a socket, the socket optionally being a mains electrical supply socket.

14. The electrical connector (500) of claim 12, which further comprises a connector housing, the varistor plate (514) being disposed within the connector housing and the pins (502, 504, 506) extending from the interior of the connector housing through the varistor plate (514) and to the exterior of the connector housing, for engagement with a complementary connector.

15. The electrical connector of claim 12, wherein the varistor plate (514) comprises a sheet of material that is substantially dielectric at low (normal operating) voltages, but which is conductive at high voltage, the high voltage corresponding to that of an electromagnetic pulse or IEMI pulse, that is substantially between 1 kV and 300 kV.

16. The electrical connector of claim 12, further comprising a one-way thermally-activated override adapted, in use, to permanently disconnect the varistor plate (514) from the circuit once the temperature of the varistor plate (514) has exceeded a predetermined temperature.

17. The electrical connector of claim 16, wherein the thermally-activated override comprises any one or more of the group comprising:
a bimetallic disc electrically connected in-series between the varistor plate (514) and ground, the bimetallic disc being configured to undergo a one-way shape change upon heating so as to form an electrical connection between the varistor plate (514) and ground below the predetermined temperature, but to permanently disconnect the varistor plate (514) from ground if the varistor plate (514) is heated to, or above, the predetermined temperature, the bimetallic disc being configured, in use, to snap from its first shape to its second shape upon heating above the predetermined temperature, and to remain snapped in the second shape regardless of subsequent cooling, and
a one-way shape memory alloy element (200) electrically connected in-series between the varistor plate (514) and ground, the one-way shape memory alloy element (200) being configured to undergo a one-way shape change upon heating.

18. The protection device of claim 1, in which the first and/or second conductive layers additionally comprises:
a metal sheet adhered, brazed or soldered to the varistor plate by the first and/or second conductive layers.

* * * * *